(12) United States Patent
Dahms et al.

(10) Patent No.: US 6,425,996 B1
(45) Date of Patent: Jul. 30, 2002

(54) WATER BATH AND METHOD FOR ELECTROLYTIC DEPOSITION OF COPPER COATINGS

(75) Inventors: Wolfgang Dahms; Michael Jonat; Gerd Senge; Detley Nitsche, all of Berlin (DE)

(73) Assignee: Atotech Deutschland GmbH, Berlin (DE)

( * ) Notice: Subject to any disclaimer, the term of this patent is extended or adjusted under 35 U.S.C. 154(b) by 0 days.

(21) Appl. No.: 09/581,379

(22) PCT Filed: Dec. 17, 1998

(86) PCT No.: PCT/DE98/03783

§ 371 (c)(1),
(2), (4) Date: Jul. 28, 2000

(87) PCT Pub. No.: WO99/31300

PCT Pub. Date: Jun. 24, 1999

(30) Foreign Application Priority Data

Dec. 17, 1997 (DE) .......................................... 197 58 121

(51) Int. Cl.$^7$ ................................................. C25D 3/38
(52) U.S. Cl. ........................ 205/298; 205/296; 205/291
(58) Field of Search ................................. 205/298, 296, 205/291

(56) References Cited

U.S. PATENT DOCUMENTS

| 664,278 A | 12/1900 | Krakau et al. | |
|---|---|---|---|
| 3,502,551 A | * 3/1970 | Todt et al. | 205/298 |
| 4,110,176 A | 8/1978 | Creutz | |
| 5,344,620 A | * 9/1994 | Reiners et al. | 427/288 |
| 5,849,171 A | * 12/1998 | Dahms et al. | 205/298 |

FOREIGN PATENT DOCUMENTS

| DE | 31 35 830 | | 3/1983 |
|---|---|---|---|
| DE | 31 35 830 | * | 4/1998 |
| DE | 196 43 091 | | 4/1998 |
| JP | 11158800 | * | 6/1999 |

OTHER PUBLICATIONS

Wet–Strength resins and their Application, A project of the Papermaking Additives Committee of TAPPI's Paper and Board Manufacture Division, Committee Assignment No. 810506.03, Lock L. Chan, Task Group Chairman and Editor, Atlanta, Georgia, 1994, pp. 23 & 24.

* cited by examiner

Primary Examiner—Kishor Mayekar
Assistant Examiner—Thao Tran
(74) Attorney, Agent, or Firm—Paul & Paul

(57) ABSTRACT

For the uniform electrolytic deposition of copper coatings, especially on printed circuit boards, an aqueous deposition bath is used which contains as constituents at least one source of copper ions, at least one compound increasing the electrical conductivity of the deposition bath as well as at least one additive, at least one transformation product, formed from epihalohydrins, dihalohydrins or respectively 1-halogen-2,3-propanediols and polyamidoamines being contained as the additive. The polyamidoamines are formed by the condensation reaction of dicarboxylic acids with polyalkylene polyamines. When copper coatings are deposited from this bath, copper layers of uniform layer thickness can be deposited.

17 Claims, No Drawings

WATER BATH AND METHOD FOR ELECTROLYTIC DEPOSITION OF COPPER COATINGS

This application is a 35 U.S.C. 371 National Stage of PCT/DE98/03783 filed on Dec. 17, 1998.

DESCRIPTION

The invention relates to an aqueous bath and a method for the electrolytic deposition of copper coatings. The bath can be used both for reinforcing conducting paths on printed circuits and for producing decorative coatings, for example on sanitary appliance and automobile parts.

The addition of organic additives to acid, especially sulphuric, electrolytic copper baths has been known for a long time. By this means, the decorative and functional properties of the copper coatings can be controlled. Above all, brightening agents are added to the baths in order to obtain bright layers. Numerous compounds and mixtures of compounds used for this purpose, for example thiourea, gelatine, molasses, coffee extract, "basic" dyes and thiophosphoric acid ester, do not have any practical significance any more since the quality of the copper coatings obtained with these compounds do not meet today's requirements. For example, with these additives no uniformly bright layers can be obtained and no layers with sufficiently high breaking elongation.

The best copper-plating baths known at this time contain as additives generally a mixture of polyethers and organic, especially aromatic thio compounds. Such a mixture is known from DE-OS 15 21 062. According to this document, the copper-plating bath can also contain phenazine dyes.

Furthermore, in DE-AS 12 46 347, the use of polyalkylenimines together with organic thio compounds was proposed for electrolytic copper-plating.

The baths mentioned do not however lead to copper layers with satisfactory properties: the layers are not uniformly thick on the frequently complexly shaped workpieces. Moreover these baths also level irregularities on the surface of the substrates to be coated to a varying extent. For this reason, copper coatings deposited from these baths do not have any uniform appearance. The functional properties are also not easily controllable.

To improve the deposition baths, in DE-OS 20 39 831 a sulphuric copper bath is described which in addition to a polymer compound containing oxygen and a thio compound with functional groups to increase water a s solubility, contains at least one dye from the group of polymeric phenazonium compounds. These baths can furthermore contain non-ionic wetting agents and organic sulphur compounds.

In EP 0 071 512 A1 is described a copper-plating bath which contains the dye crystal violet in addition to the potassium salt of N,N-diethyldithiocarbamate-S-ω-propylsulphonate.

In DE 34 20 999 A1 is described a bath with organic thio compounds and polyether compounds together with phthalocyanine derivatives and aposafranine compounds.

However it has been shown that, with these baths, especially in the upper current density region high levelling of the copper coating occurs whilst the levelling in the low current density region is relatively small. When the bath is used for the production of printed circuit boards this leads to the so called phenomenon of hole edge flattening in which a reduction in the copper layer thickness in the immediate proximity of bores in the printed circuit boards is observed, such that breaks occur in the copper coating at the hole entrances during soldering. In decorative copper deposition, this disadvantage leads to a non-uniform appearance of the layer at different locations of the workpiece, such that the bath can only be used up to a point for this application.

Instead of dyes, transformation products of polyalkanolamines with an alkylation or quarternisation agent, for example benzyl chloride (U.S. Pat. No. 4,110,176) and of polyalkylenimines with epichlorohydrine and an alkalisation agent (EP 0 068 807 A2) have also been proposed as additives in copper baths. Furthermore, in EP 0 107 109 A2 transformation products of thio compounds with acrylamide are also described.

In U.S. Pat. No. 664,278 is disclosed a copper-plating bath which contains, in addition to the usual bath constituents, transformation products of epichlorohydrine with aromatic compounds containing nitrogen.

Through the addition of these compounds, the levelling of the copper coating can be improved in a lasting manner. However the metal distribution is worsened, that is the uniformity of the layer thickness at different locations of a workpiece, at which also different current densities occur. By this means only layers of non-uniform appearance can be obtained. It has emerged that this disadvantage appears in particular if thio compounds containing nitrogen are used as the additives. Moreover, these compounds only act in the desired manner within a very narrow concentration range, such that during the practical operation of a bath with these compounds, the optimal concentration range can frequently not be maintained. For example, on increasing the concentration by several milligrams per liter above the upper concentration limit, already hole wall flattenings occur on printed circuit boards, such that the printed circuits get cracks during subsequent soldering and become unusable.

In DE 27 46 938 A1 is described a bath which contains as additives inter alia acid amides together with a high-molecular compound containing oxygen and an organic thio compound with functional groups to increase the water solubility. With this bath only an improvement of the distribution of the brightness could be achieved, but not an improvement of the metal distribution.

The high-molecular compounds containing oxygen usually used as additives in electrolytic copper baths only have low stability. They decompose when used on the electrodes to polymers which are insoluble in the bath and which accumulate in the bath. These undesired reaction products cream out as a gelatinous mass on the container walls and are even deposited on the surfaces of the items to be treated, such that defects are formed on the item to be treated and it therefore becomes unusable. Particularly at increased bath temperatures the decomposition is accelerated, such that very quick decomposition is observed at temperatures above 28° C.

It has also become apparent that the additives mentioned frequently lead to a worsening of the mechanical properties, in particular the hardness and the breaking elongation of the copper coatings, compared with deposition methods in which these additives are not used. Equally the layers deposited with these substances have signs of passivity, which require subsequent activation for further treatment by electroplating means. Moreover many of these types of substances, which act as inhibitors for the copper deposition, worsen the metal dispersion, such that on account of low metal layer thickness in places, cracks occurs in bores and hole edges on printed circuit boards, especially if the copper layer is thermally stressed by soldering processes.

Moreover, from U.S. Pat. No. 3,502,551 is known an aqueous acid copper bath which contains at least one copper salt, at least one inorganic acid and possibly a chloride and, as additives, an aliphatic hydrocarbon compound having a plurality of amino groups, a high-molecular organic compound containing oxygen and, to increase the water solubility, an organic thio compound with functional groups. Through the combination of these additives, the brightening and levelling of the deposited copper layer is intended to be improved.

Furthermore, from DE 27 06 521 A1 copper electrolytes are known which contain transformation products of epihalohydrins with substituted pyridines, organic thio compounds and wetting agents as bath additives. With this bath, an improvement of the distribution of brightness could be achieved but not any improvement in the metal distribution however.

The two last-mentioned types of baths have the disadvantage of poor metal dispersion. Uniform distribution of metal is however necessary, particularly in the metallisation of printed circuits which have a large number of small bore holes. If a layer of too small a thickness is deposited in these bores, it tears under thermal stress, for example during soldering, such that the passage of current is interrupted. Printed circuit boards damaged in this way are unusable. Since printed circuit boards with smaller and smaller bore hole diameters are being manufactured, for example 0.25 mm, the requirements of the metal dispersion into these bores is very high. It has been observed that the copper layer thickness is unsatisfactory particularly in bores with a small diameter. To quantify this, the measurement of the metal dispersion is taken. This is quoted as the ratio of the copper layer thickness in the middle of the bore to the copper layer thickness on the outer side of the printed circuit board. With the known baths, in bores with a small diameter, for example 0.3 mm, only metal dispersion values of 30 to 40% can be achieved, whilst for the dispersion in large bores, for example those having a diameter of 1 mm, values of 100% are obtained.

Underlying the present invention, therefore, is the problem of avoiding the disadvantages of the known methods and deposition baths and in particular making available a copper-plating bath, with which copper coatings can be produced with excellent mechanical properties, such as good breaking elongation, as well as very uniform layer thickness even in bores with a small diameter, it being intended that these properties should also be achievable with considerable fluctuations of the bath composition, since, in practical operation, the composition can frequently not be adjusted constantly. The bath should in particular be able to be used in printed circuit board technology. For this reason, even under thermal stress, no cracks should be able to form in the deposited layer.

This problem is solved by an aqueous bath according to claim 1 and a deposition method according to claim 17. Preferred embodiments of the invention are quoted in the subordinate claims.

The bath according to the invention contains, besides the constituents usually used, at least one source of copper ions and at least one compound increasing the electrical conductivity of the bath, for example an acid, and in addition at least one additive, which is formed as a transformation product from compounds, selected from the group consisting of epihalohydrins, dihalohydrins, and 1-halogen-2,3-propanediols, and polyamidoamines.

With this bath, copper coatings of very uniform layer thickness can be produced even in very narrow bores. Furthermore, the copper layers deposited from this bath have an excellent breaking elongation, and when additional brightening agents are used as bath additives, also a very uniform brightness on the entire workpiece surface. The uniformity of the copper layer is made possible by the addition of the epihalohydrin or dihalohydrin or 1-halogen-2,3-propanediol/polyamidoamine additive to the bath. The optical and mechanical properties as well as the layer thickness are largely independent of the local current density and moreover depend only slightly on the concentration of the additive in the deposition bath. On account of these good properties, baths with the additives according to the invention are very suitable for the manufacture of printed circuit boards.

Using the known compounds containing oxygen is not necessary. It has emerged that the metal dispersion is even lessened with the extra addition of these compounds. Through further bath additives, for example organic thio compounds, thio compounds containing nitrogen and/or polymeric phenazonium compounds, the positive effects of the additives can, however, be further increased.

The additives according to the invention can be manufactured in a manner known per se: a manufacturing method is given in DE 31 35 830 A1.

According to the latter, these substances are produced in a two-stage reaction. In the first reaction stage, per mol of dicarboxylic acids, which preferably contain 4 to 10 carbon atoms, 1 to 2 mol polyalkylene polyamine are condensed, which preferably contain 3 to 10 basic nitrogen atoms (amino groups). During this condensation reaction, polyamidoamines are obtained. The reaction conditions for the condensation reaction are given in detail in the publication mentioned. According to the latter, the reaction is preferably carried out in the substance without using any solvent. According to another manufacturing method, an inert solvent can also be used. To carry out the reaction, a reaction temperature of 80° C. to 200° C. is set. The water produced during the condensation reaction is continually removed from the reaction mixture by distillation.

Suitable dicarboxylic acids are in particular succinic acid, maleic acid, fumaric acid, adipic acid, glutaric acid, suberic acid, sebacinic acid, phthalic acid and terephthalic acid. For manufacturing the polyamidoamines it is also possible to use mixtures of different dicarboxylic acids, for example mixtures of adipic acid with glutaric acid or maleic acid. Adipic acid is preferably used as the dicarboxylic acid.

The polyalkylene polyamines used for the condensation are preferably diethylenetriamine, triethylene tetramine, tetraethylenepentamine, dipropylenetriamine, tripropylene tetramine, bis-(hexamethylene)-triamine, hexamethylene triamine and bis-(aminopropyl)-piperazine.

In addition, the condensation reaction mixture can also contain diamines. The diamines should be used in a concentration of at the most 10 wt-% in relation to the amount of polyalkylene polyamines. For example ethylene diamine, 3-methylaminopropylamine and hexamethylene diamine can be used.

Furthermore, the condensation reaction can also be carried out in the presence of lactones and/or lactams. For this purpose, preferably lactones and lactams having 5 to 12 carbon atoms are used. Both the diamines and the lactams or lactones are incorporated into the polyamidoamine condensate during the condensation reaction.

To produce the additives according to the invention, in the second reaction stage epihalohydrins, dihalohydrins or 1-halogen-2,3-propanediols and the polyamidoamine formed in the first stage are transformed in an aqueous solution. As epihalohydrins are preferably used 1-chloro-2,3-epoxypropanol and 1-bromo-2,3-epoxypropanol, as dihalohydrins preferably 1,3-dichloro-2-propanol and 1,3-dibromo-2-propanol and as 1-halogen-2,3-propanediols preferably 1-chloro-2,3-propanediol and 1-bromo-2,3-propanediol.

The epihalohydrins, dihalohydrins or 1-halogen-2,3-propanediols are reacted with the polyamidoamines preferably in a ratio of 0.2 to 3 mol epihalohydrins, dihalohydrins or 1-halogen-2,3-propanediols to 1 mol polyamidoamines.

The pH value of the reaction solution in the second reaction stage is preferably set at 4.5 to 8.5, preferably at 5 to 7. The reaction is carried out at up to 100° C., preferably from 20° C. to 60° C.

To carry out the reaction, the polyamidoamines are dissolved in water and the solution is set at the pH value range mentioned through the addition of inorganic or organic acids. The concentration of the polyamidoamines can fluctuate in the reaction solution within a wide range. It is preferably 20 to 60 wt-%. As organic acids to set the pH value can be used in particular formic acid, ethanoic acid, propionic acid and oxalic acid. As inorganic acids can be considered above all hydrochloric acid, sulphuric acid and phosphoric acid.

The transformation of the epihalohydrins, dihalohydrins or 1-halogen-2,3-propanediols with the polyamidoamines takes place practically quantitatively. It is ended as soon as there is no more epihalohydrin, dihalohydrin or respectively 1-halogen-2,3-propanediol and no polyamidoamine present any more. The duration of the reaction is roughly 5 minutes to roughly 3 hours, depending on the type of reaction partners used.

The relative molar mass of the transformation products can lie in a range from 150 to 350,000 g/mol, preferably from 300 to 14,000 g/mol. The additives obtained are added to the bath in a concentration of 0.005 to 50 g/l bath, preferably of 0.02 to 8.0 g/l. In Table 1 are listed polyamidoamines which can be reacted with epihalohydrins, dihalohydrins or 1-halogen-2,3-propanediols, the transformation products obtained, when used in the electrolytic copper-plating baths, rendering possible excellent properties of the deposited copper layers, in particular an excellent metal dispersion. In the table are furthermore quoted preferred concentrations of the additives in the copper baths obtained after reaction with epichlorohydrine or dichlorohydrine.

In addition to the additive obtained from the epihalohydrins, dihalohydrins or 1-halogen-2,3-propanediols and polyamidoamines, at least one thio compound with chemical residues to increase the water solubility can be contained in the deposition solution, in order to deposit bright copper layers. Through the additives according to the invention, obtained simultaneously, a brightness is obtained which is independent of the local current density. Furthermore, thio compounds containing nitrogen and/or polymeric phenazonium compounds can also be contained in addition.

For the electrolytic deposition of uniformly thick copper layers on a workpiece, the workpiece and an electrode serving as the anode are brought into contact with the bath, and the electrode and the workpiece connected to a voltage source, such that the electrode is polarised as the anode and the workpiece as the cathode.

The copper bath contains a source of copper ions, for example copper sulphate, and a compound increasing the electrical conductivity of the bath, for example sulphuric acid, and usually a chloride. This basic composition of the bath can fluctuate within wide limits. Generally an aqueous solution of the following composition is used:

| | |
|---|---|
| copper sulphate (CuSO$_4$·5H$_2$O) | 20 to 250 g/l |
| preferably | 60 to 80 g/l or |
| | 180 to 220 g/l |
| sulphuric acid | 50 to 350 g/l |
| preferably | 180 to 220 g/l or |
| | 50 to 90 g/l |
| chloride ions | 0.01 to 0.18 g/l |
| preferably | 0.03 to 0.10 g/l |

Instead of copper sulphate, other copper salts can also be used at least partially. The sulphuric acid can also be replaced partially or completely by fluoboric acid, methane sulphonic acid or other acids. The chloride ions are added as alkali chloride (for example sodium chloride) or in the form of hydrochloric acid (p.A.). The addition of sodium chloride can be dispensed with completely or partially if halogenide ions are contained already in the additives.

Moreover, standard brightening agents, levelling agents, wetting agents or further usual additives can be contained in the bath. In order to obtain bright copper deposits with certain material properties, to the deposition bath are added at least one water-soluble thio compound, preferably an organic thio compound, thio compounds containing nitrogen and/or polymeric phenazonium compounds.

These individual components are contained within the following limiting concentrations in the prepared bath:

| | |
|---|---|
| water-soluble organic thio compounds | 0.0005 to 0.4 g/l |
| preferably | 0.001 to 0.15 g/l |

In Table 2, organic thio compounds are listed by way of example, which can be used in combination with the additives according to the invention. To increase the water solubility, corresponding functional groups are contained in the compounds.

Thio compounds containing nitrogen (thiourea derivatives) and/or polymeric phenazonium compounds can be contained in the bath respectively in the following concentrations:

| | |
|---|---|
| preferably | 0.0001 to 0.50 g/l |
| | 0.0005 to 0.04 g/l |

Typical thio compounds containing nitrogen are listed in Table 3 and polymeric phenazonium compounds in Table 4. To produce the bath, the additives and other admixtures are added to the basic composition. The operating conditions of the bath are as follows:

| | |
|---|---|
| pH value | <1, |
| temperature | 15° C. to 50° C. |
| preferably | 25° C. to 40° C. |
| cathodic current density: | 0.5 to 12 A/dm$^2$ |
| preferably | 3 to 7 A/dm$^2$ |

The deposition bath is agitated by a strong oncoming flow and possibly by injection of clean air in such a way that the bath surface is in strong motion. By this means the matter transport in the proximity of the cathodes and anodes is maximised, such that greater current densities are rendered possible. A movement of the cathodes also causes an improvement in the matter transport at the respective surfaces. Through the increased convection and electrode movement a constant diffusion-controlled deposition is achieved. The substrates can be moved horizontally, vertically and/or by vibration. A combination with air injection into the deposition bath is particularly effective.

The copper used up during the deposition process is replenished electrochemically via the copper anodes. For the anodes, copper having a content of 0.02 to 0.067 wt-% phosphor is used. They can be suspended directly in the electrolyte or be used in the form of balls or pieces and filled for this purpose into titanium baskets which are located in the bath.

The following examples and comparative examples serve to explain the invention:

EXAMPLE 1

To a copper bath having the composition
200 g/l copper sulphate ($CuS=_4.H_2O$)
65 g/l sulphuric acid
0.12 g/l sodium chloride
were added as bath additives
  0.25 g/l transformation product of dichlorohydrine with the polyamidoamine no. 3 from Table 1
  0.05 g/l bis-(ω-sulphopropyl)-disulphide disodium salt and
  0.005 g/l poly(7-dimethylamino-5-phenyl-phenazonium chloride).

At an electrolyte temperature of 30° C. and a current density of 4 A/dm$^2$ and with agitation of the bath through air injection, a well-levelled, bright copper coating was obtained.

Comparative Example 1

To a copper bath having the composition
80 g/l copper sulphate ($CuS04.H_2O$)
180 g/l sulphuric acid
0.08 g/l sodium chloride
were added as bath additives
  0.60 g/l polypropylene glycol
  0.02 g/l 3-mercaptopropane-1-sulphonic acid, sodium salt and
  0.003 g/l N-acetylthiourea At an electrolyte temperature of 30° C. and a current density of 2 A/dm$^2$ a bright copper coating was obtained and when deposited on a 3 mm thick printed circuit board with bores having a diameter of 0.3 mm or respectively 0.5 mm, a metal distribution of 28% (0.3 mm) or respectively 49% (0.5 mm) was obtained.

To determine the metal dispersion, printed circuit boards were electrolytically coated and then so cut that one cut passed exactly through the middle of a bore parallel to its axis. The sample so prepared was embedded in synthetic resin to prepare a traverse section. When the traverse section was completed, the cut copper layer on the upper and lower sides of the printed circuit board and the layer in the bore could easily be recognised with the aid of a microscope. Its thickness could therefore be determined exactly.

EXAMPLE 2

After replacing the polypropylene glycol from Comparative example 1 by 0.25 g/l of the transformation product of dichlorohydrine with the polyamidoamine no. 5 from Table 1, a noticeably better metal distribution was obtained in the bores having a diameter of 0.3 mm or respectively 0.5 mm. The measured values were 45% (0.3 mm) or respectively 67% (0.5 mm). The necessary amount of the bath additive used was moreover substantially lower than in the comparative example, such that cheaper copper-plating was made possible with the more effective additive.

Comparative example 2

To a copper bath having the composition
80 g/l copper sulphate ($CuSO_4.H_2O$)
200 g/l sulphuric acid
0.06 g/l sodium chloride
were added as bath additives
  0.4 g/l octyl polyethylene glycol ether
  0.01 g/l bis-(ω-sulphopropyl)-sulphide, disodium salt and
  0.01 g/l polyacrylic acid amide At an electrolyte temperature of 30° C. and a current density of 2.5 A/dm$^2$ on a 1.6 mm thick printed circuit board with bores having a diameter of 0.3 mm or respectively 0.5 mm, it was possible to obtain a metal distribution of 50% (0.3 mm) or respectively 75% (0.5 mm). The copper coating was uniformly bright.

EXAMPLE 3

The ether (octyl polyethylene glycol ether) and the amide (polyacrylic acid amide) of Comparative example 2 were replaced by the transformation product of dichlorohydrine with the polyamidoamine no. 6 from Table 1. By this means, a metal distribution of 70% (0.3 mm) or respectively 100% (0.5 mm) could be achieved.

EXAMPLE 4

To a copper bath having the composition
65 g/l copper sulphate ($CuSO_4-H_2O$)
250 g/l sulphuric acid
0.06 g/l sodium chloride
was added as a bath additive
  1.0 g/l transformation product of dichlorohydrine with the polyamidoamine no. 5 from Table 1.

At an electrolyte temperature of 22° C. and a current density of 2.5 A/dm$^2$, a dull copper coating was formed. On a 2 mm thick printed circuit board with bores having a diameter of 0.35 mm, a metal distribution of 83% could be obtained.

Without the addition of the transformation product with the polyamidoamine no. 5, a metal distribution of only roughly 33% was achieved. The copper layer was non-uniformly spotted and dull.

EXAMPLES 4 to 12

Similarly good results were obtained on repeating Examples 1 to 4, there being used in the individual tests, instead of the transformation products of dichlorohydrine with the polyamidoamines, transformation products of 1-chloro-2,3-propanediol with the respective polyamidoamines nos. 3, 5 and 6, and transformation products of epichlorohydrine with the respective polyamidoamines nos. 3, 5 and 6.

TABLE 1

Polyamidoamines

| No. | Amine | Acid | Additive | Preferred conc. [g/l] |
|---|---|---|---|---|
| 1 | diethylene-triamine | suberic acid | | 0.4–0.6 |
| 2 | tripropylene tetramine | adipic acid | | 0.2–0.4 |
| 3 | tetraethylene-pentamine | maleic acid | | 0.1–0.2 |
| 4 | bis-(hexamethylene)-triamine | succinic acid | 3-methylamino-propylamine | 0.3–0.5 |
| 5 | dipropylene-triamine | adipic acid | ε-caprolactam | 0.2–0.4 |
| 6 | tripropylene tetramine | maleic acid | γ-butyrolactam | 0.4–0.6 |

TABLE 2

Thio compounds

| | preferred conc. [g/l] |
|---|---|
| 3-mercaptopropane-1-sulphonic acid, sodium salt | 0.002–0.1 |
| thiophosphoric acid-O-ethyl-bis-(ω-sulphopropyl)-ester, disodium salt | 0.01–0.15 |
| thiophosphoric acid-tris-(ω-sulphopropyl)-ester, trisodium salt | 0.02–0.15 |
| thioglycolic acid | 0.001–0.005 |
| ethylenedithiodipropyl sulphonic acid, sodium salt | 0.001–0.1 |
| bis-(ω-sulphopropyl)-disulphide, disodium salt | 0.001–0.05 |
| bis-(ω-sulphopropyl)-sulphide, disodium salt | 0.01–0.15 |
| O-ethyl-dithiocarbonic acid-S-(ω-sulphopropyl)-ester, potassium salt | 0.002–0.05 |
| 3-(benzothiazolyl-2-thio)-propyl sulphonic acid, sodium salt | 0.005–0.1 |
| bis-(ω-sulpho-2-hydroxypropyl)-disulphide, disodium salt | 0.003–0.04 |
| bis-(ω-sulphobutyl)-disulphide, disodium salt | 0.004–0.04 |
| bis-(p-sulphophenyl)-disulphide, disodium salt | 0.004–0.04 |
| methyl-(ω-sulphopropyl)-disulphide, disodium salt | 0.007–0.08 |
| methyl-(ω-sulphopropyl)-trisulphide, disodium salt | 0.005–0.03 |

TABLE 3

Thio compounds containing nitrogen

N-acetylthiourea
N-trifluoroacetylthiourea
N-ethylthiourea
N-cyanoacetylthiourea
N-allylthiourea
o-tolylthiourea
N,N'-butylene thiourea
thiazolidinethiol-(2)
4-thiazolinethiol-(2)
imidazolidinethiol-(2)-(N,N'-ethylene thiourea)
4-methyl-2-pyrimidinethiol
2-thiouracil

TABLE 4

Polymeric phenazonium compounds poly(6-methyl-7-dimethylamino-5-phenyl-phenazonium sulphate)
poly(2-methyl-7-diethylamino-5-phenyl-phenazonium chloride)
poly(2-methyl-7-dimethylamino-5-phenyl-phenzaonium sulphate)
poly(5-methyl-7-dimethylamino-phenazonium acetate)
poly(2-methyl-7-anilino-5-phenyl-phenazonium sulphate)
poly(2-methyl-7-dimethylamino-phenazonium sulphate)

TABLE 4-continued

Polymeric phenazonium compounds poly(7-methylamino-5-phenyl-phenazonium acetate)
poly(7-ethylamino-2,5-diphenyl-phenazonium chloride)
poly(2,8-dimethyl-7-diethylamino-5-p-tolyl-phenazonium chloride)
poly(2,5,8-triphenyl-7-dimethylamino-phenazonium sulphate)
poly(2,8-dimethyl-7-amino-5-phenyl-phenazonium sulphate)
poly(7-dimethylamino-5-phenyl-phenazonium chloride)

What is claimed is:

1. Aqueous bath for the electrolytic deposition of copper coatings, containing at least one source of copper ions, at least one compound increasing the electrical conductivity of the bath and at least one additive, characterised in that, as additive is contained at least one transformation product, formed from at least one compound, selected from the group consisting of epihalohydrins, dihalohydrins and 1-halogen-2,3-propanediols, with at least one polyamidoamine.

2. Bath according to claim 1, characterized by epihalohydrins, selected from the group consisting of 1-chloro-2,3-epoxypropanol and 1-bromo-2,3-epoxypropanol.

3. Bath according to one of the preceding claims, characterized by dihalohydrins, selected from the group consisting of 1,3-dichloro-2-propanol and 1-3-dibromo-2-propanol.

4. Bath according to one of the preceding claims 1–2, characterized by 1-halogen-2,3-propanediols, selected from the group consisting of 1-chloro-2,3-propanediol and 1-bromo-2,3-propanediol.

5. Bath according to one of the preceding claims 1–2, characterized in that the additives are formed by transformation of 0.2 to 3 mol of the compounds, selected from the group consisting of epihalohydrins, dihalohydrins and 1-halogen-2,3-propanediols, per 1 mol polyamidoamine.

6. Bath according to one of the preceding claims 1–2, characterized in that the additives are contained in a concentration of 0.005 to 50 g/l bath.

7. Bath according to one of the preceding claims 1–2, characterized in that at least one thio compound is contained in addition.

8. Bath according to one of the preceding claims 1–2, characterized in that at least one nitrogen containing thio compound is contained in addition.

9. Bath according to one of the preceding claims 1–2, characterized in that at least one polymeric phenazonium compound is contained in addition.

10. Bath according to one of the preceding claims 1–2, characterized by polyamidoamines, produced as the reduction product of at least one dicarboxylic acid with at least one polyalkylene polyamine.

11. Bath according to claim 10, characterized by polyalkylene polyamines with three to ten amino groups.

12. Bath according to claim 10, characterized by polyalkylene polyamines, selected from the group consisting of diethylenetriamine, triethylene tetramine, tetraethylenepentamine, dipropylenetriamine, tripropylene tetramine, bis-(hexamethylene)-triamine, hexamethylene triamine and bis-(aminopropyl)-piperazine.

13. Bath according to claim 10, characterized by dicarboxylic acids, selected from the group consisting of succinic acid, maleic acid, fumaric acid, adipic acid, glutaric acid, suberic acid, sebacinic acid, phthalic acid and terephthalic acid.

14. Bath according to claim 10, characterized by polyamidoamines, produced as a reaction product of at least one dicarboxylic acid, at least one polyalkylene polyamine and at least one diamine.

15. Bath according to claim 14, characterized in that the diamines are used in a concentration of at the most 10 wt-% in relation to the amount of polyalkylene polyamines.

16. Bath according to claim 10, characterized in that the reaction products are formed in the presence of at least one lactone and/or at least one lactam.

17. Method of electrolytically depositing uniformly thick copper coatings on a workpiece, having the following method steps:

a. preparation of an aqueous copper deposition bath, an electrode and a voltage source
b. bringing the workpiece and the electrode into contact with the bath,
c. electrically connecting the electrode and the workpiece to the voltage source, such that the electrode is polarized as the anode and the workpiece as the cathode, characterized in that the bath according to one of claims 1 to 2 is used as the copper deposition bath.

* * * * *